United States Patent [19]

Brashear

[11] Patent Number: 4,590,886

[45] Date of Patent: May 27, 1986

[54] PORTABLE HORSE STOCKS

[76] Inventor: Robert L. Brashear, 2300 Ash Ave., Anchorage, Ky. 40223

[21] Appl. No.: 672,599

[22] Filed: Nov. 19, 1984

[51] Int. Cl.[4] ........................ A61D 3/00; A01K 1/00

[52] U.S. Cl. ........................ 119/27; 119/99

[58] Field of Search ........................ 119/20, 27, 99, 155

[56] References Cited

U.S. PATENT DOCUMENTS

| | | | |
|---|---|---|---|
| 44,095 | 9/1864 | Hughes . | |
| D. 229,199 | 11/1973 | Smith | D30/99 |
| D. 254,753 | 4/1980 | McDonald | D30/2 |
| 721,540 | 2/1903 | Buckingham . | |
| 732,232 | 6/1903 | Stitzer | 119/27 |
| 735,567 | 8/1903 | McGowan . | |
| 825,018 | 7/1906 | Davis . | |
| 1,182,828 | 5/1916 | Winans . | |
| 1,611,935 | 12/1926 | Mitchell | 119/27 X |
| 1,621,760 | 3/1927 | Stader et al. . | |
| 2,714,367 | 8/1955 | Arnold | 119/27 |
| 2,804,046 | 8/1957 | Turner | 119/99 |
| 3,051,127 | 8/1962 | Norbury | 119/99 |
| 3,370,835 | 2/1968 | Crowson | 256/26 |
| 3,412,711 | 11/1968 | Martensson et al. | 119/20 |
| 3,788,280 | 1/1974 | Van Gilst | 119/99 |
| 4,217,860 | 8/1980 | Gloggler | 119/27 |
| 4,350,117 | 9/1982 | Hacker | 119/27 |
| 4,432,305 | 2/1984 | Vernese | 119/98 |

*Primary Examiner*—Robert P. Swiatek

*Attorney, Agent, or Firm*—Antonelli, Terry & Wands

[57] ABSTRACT

Portable horse stocks are disclosed. The stocks are formed from a plurality of components which may be readily assembled and disassembled for ease in transportation and storage. The stocks comprise a pair of opposite side frames positioned in spaced relationship, a pair of opposite end gates positioned in spaced relationship and extending transversely between the opposite side frames to define a space with the side frames within the stock for confining a horse or the like. The end gates are releasably connected to the side frames in a manner which permits the end gates to be lifted off hinge pins in their open position but not in the closed position. A side frame of the horse stocks also includes a side gate which can readily be lifted off its hinges in the open position but not in the closed position. The heights of the end gates and the side gate of the horse stocks are adjustable.

19 Claims, 10 Drawing Figures

FIG. 4.
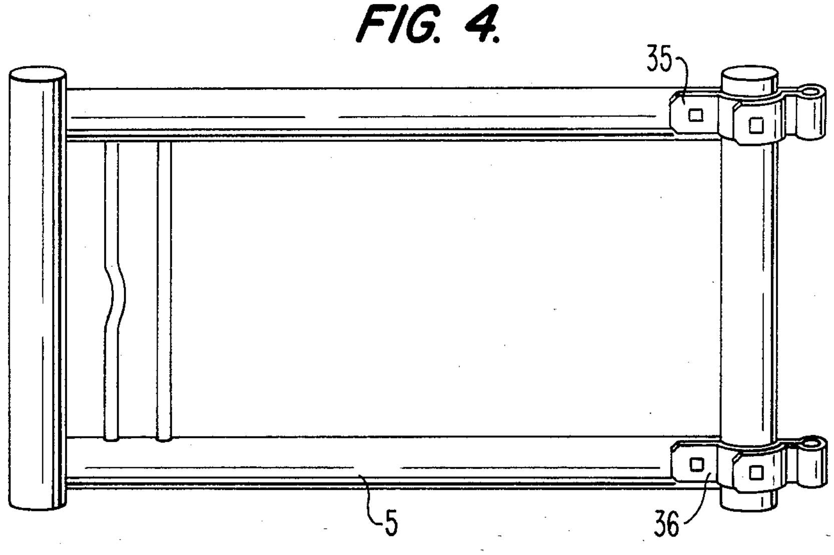
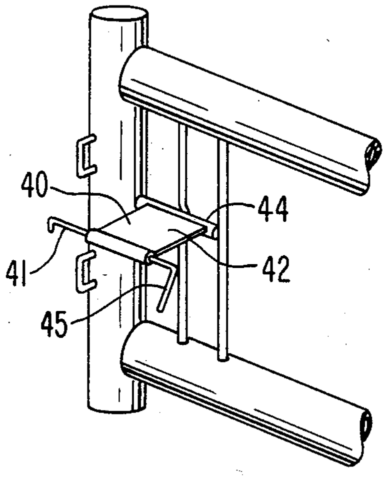
FIG. 5.
FIG. 10.
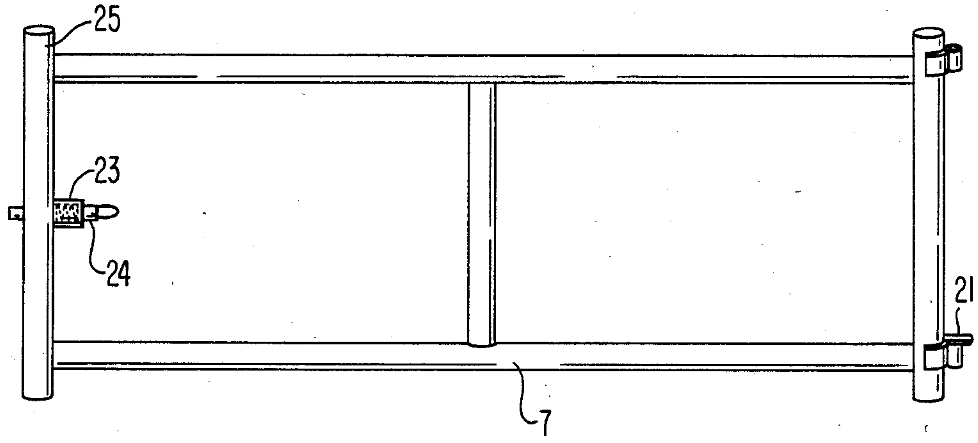

PORTABLE HORSE STOCKS

BACKGROUND AND SUMMARY OF THE INVENTION

The present invention is directed to improved stocks for livestock, particularly horses. More specifically, the invention relates to portable horse stocks which are formed from a plurality of components which may be readily assembled and disassembled for ease in transportation and storage. The portable horse stocks include horse safety and other features to aid the veterinarian or attendant.

It is known to provide stocks that are portable by making the stocks with a sled design so that they can be pulled from one location to another. However, such stocks are not easily manuevered through doors, etc., and they require considerable space for storage.

An object of the present invention is to provide portable horsestocks which need not be formed with a sled design to be pulled about but which, instead, may be anchored in the floor or other surface where they are to be used.

A further object of the invention is to provide portable horse stocks formed from a plurality of components which may be readily assembled and disassembled for easy manuevering through doors, storage, etc.

An additional object of the invention is to provide improved portable horse stocks which permit the veterinarian or other attendant a great number of options as to the ingress and egress of the horse or other animal from the stocks while providing a high degree of accessibility to the confined animal for treatment or other purpose.

These and other objects are attained by providing portable horse stocks according to the invention which are formed from a plurality of components which may be readily assembled and disassembled for ease in transportation and storage. More particularly, the portable stocks comprise a pair of opposite side frames positioned in spaced relationship, a pair of opposite end members positioned in spaced relationship and extending transversely between the opposite side frames to define a space with the side frames within the stocks for confining a horse or the like, means releasably connecting the end members to the side frames to permit the assembly and disassembly, at least one of the end members being an end gate swingably mounted on one of the side frames for movement between an open position providing access to the space through an end gate opening and a closed position substantially blocking the end gate opening, and at least one of the side frames including a side gate swingably mounted on the side frame for movement between an open position providing access to the space through a side gate opening and a closed position substantially blocking the side gate opening.

The stocks further include means for adjusting the height of the side gate with respect to its side frame. In the disclosed, preferred embodiment of the invention the height adjusting means includes a pair of hollow sleeves which are slidingly positioned about respective upright members of the side frame. The side gate is swingably mounted at one end thereof to one of the sleeves and releasably connected by latching means at its other end to the other of the sleeves when the side gate is in its closed position. Means are provided for supporting the sleeves and the side gate in either a first lower position or a second higher position on the upright members of the side frame for accommodating animals of different sizes.

The sleeves each include a longitudinally extending slot formed therein to accomodate a latching lug on its cooperating upright member for latching an end gate in its closed position. The lugs also serve as stops for the sleeves to support the side gate in its lower position. Sliding sleeve guides are provided on the cooperating upright members so as to extend into the slots in the sleeves for guiding and maintaining alignment of the sleeves on the respective upright members.

The sleeve on which the side gate is swingably mounted includes two balance rollers at opposite ends thereof which engage the adjacent upright member to prevent the sliding sleeve from binding when it and the side gate are moved between the first and second positions. A spring biased fastening device is provided on each of the sleeves for securing the sleeves to the respective adjacent upright members to support the side gate in the second higher position. These fastening devices can be pulled out against the bias of the springs to allow the side gate to be lowered from the second higher position to the first lower position.

A pair of hinge pins is provided on one of the sleeves for swingably mounting the side gate with respect to the sleeve and its adjacent upright member of the side frame. Hinges on the side gate receive the hinge pins in a manner which permits the side gate to be readily removed from the sleeve by lifting the side gate when the side gate is in its full open position. A plate is attached at the top of one of the hinges on the side gate. The plate extends under a block attached on the sleeve provided with the hinge pins so that both the side gate and sleeve are lifted by lifting the gate when the side gate is in its closed. This arrangement prevents removal of the side gate from the hinge pins except when the gate is in its full open position. A spring loaded locking device releasably maintains the side gate in its closed position adjacent the other sleeve while coupling the gate and other sleeve so that both move in the vertical direction when the height of the side gate is adjusted.

The portable horse stocks of the invention further include means for adjusting the height of the at least one end gate of the horse stocks with respect to the side frames. In the disclosed embodiment the means releasably connecting the end gate to the side frames includes a pair of hinge pins which are provided on one of the side frames. The hinge pins are received in hinges on one end of the end gate for swingably mounting the end gate while permitting the end gate to be lifted off the hinge pins in its open position. A stud connected to one of the hinges on the end gate is received in a hole provided in the adjacent side frame when the end gate is closed to prevent the end gate from being listed off the hinge pins in the closed position by animal movement, for example. A second pair of hinge pins are provided on the side frame in vertically spaced relationship to the first pair to permit adjusting the height at which the side gate is swingably mounted on the side frame.

A latch is provided on the end gate for releasably securing the end gate in the closed position. The vertical position of the latch on the end gate is adjustable so that the latch can releasably connect the end gate to a single stationary latch on the side frame at different heights of the end gates with respect to the side frames.

In the preferred embodiment of the horse stocks, each of the end members is an end gate which is swingably mounted on one of the side frames for movement between an open position and a closed position and the side gate spans essentially the entire length of the side frame thereby permitting ingress and egress of the horse or other animal and also access to the animal from three different sides of the stocks.

The stocks further include means for anchoring the side frames thereof to the floor or other surface upon which the stocks are assembled. In the illustrated embodiment, this means for anchoring includes hollow tubular inserts which are at least partially recessed within the floor or other surface for receiving lower portions of the upright members of the side frames. A leveling collar is positioned between each of the upright members and its cooperating tubular insert. The leveling collars are connected to the lower portions of the upright members at locations which level the horse stocks.

These and other objects, features and advantages of the invention will become more apparent from the following description when taken in connection with the accompanying drawings which show, for purpose of illustration only, one preferred embodiment in accordance with the invention.

BRIEF DESCRIPTION OF THE DRAWINGS

FIG. 4 is a side elevational view of the end gate of FIG. 3 without its adjustable latch;

FIG. 5 is a perspective view of a portion of the end gate of FIG. 4 wherein the adjustable latch for the gate is shown;

FIG. 10 is a side elevational view of the side gate of the side frame of the horse stocks of FIG. 1.

DESCRIPTION OF THE DISCLOSED EMBODIMENT

Figure 1:
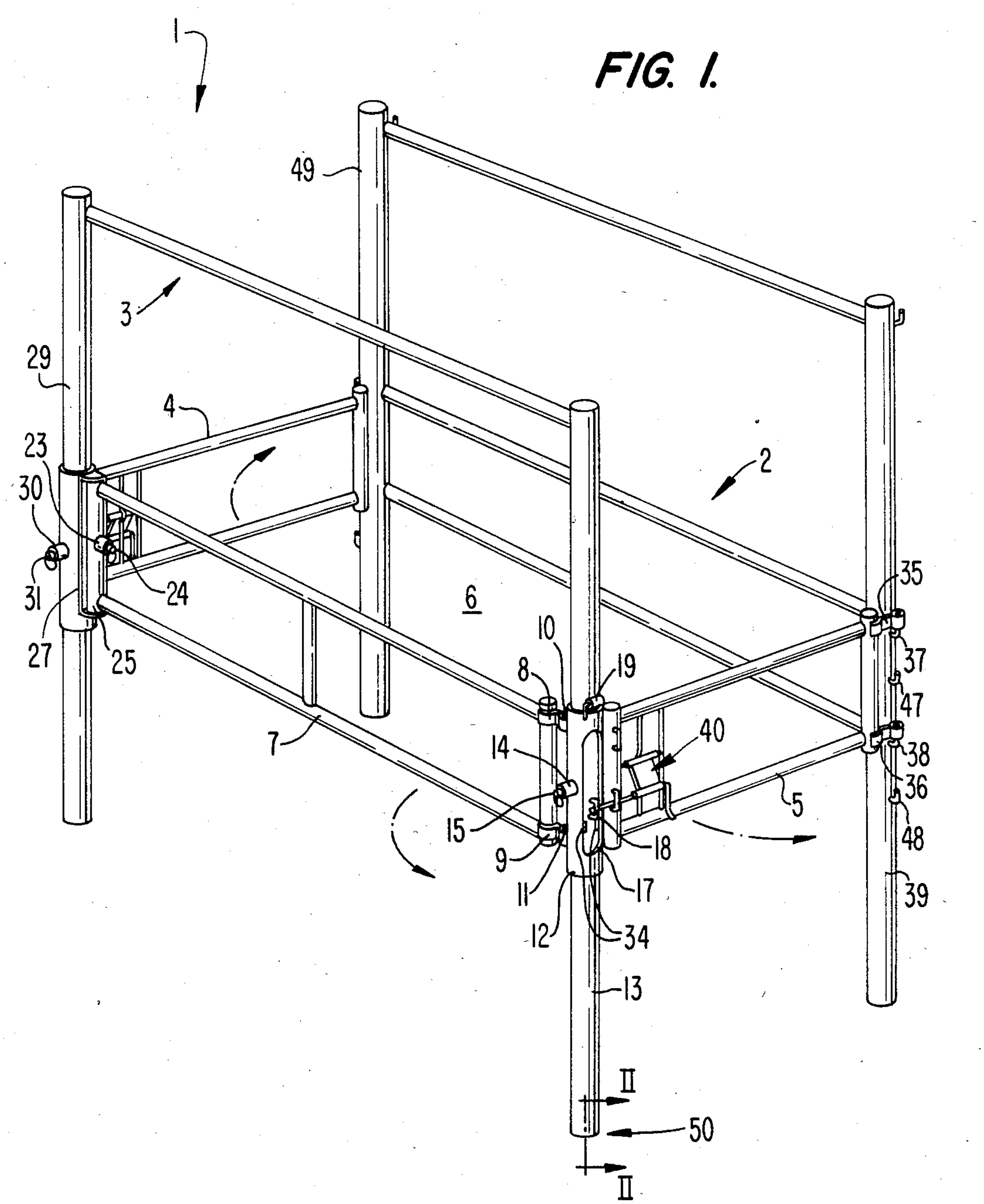
FIG. 1 is a perspective view from the front and to one side of the portable stocks according to the invention.

Referring now to the drawings, and particularly FIG. 1 thereof, it is seen that portable stocks 1 according to the invention are formed from a plurality of components including a pair of opposite side frames 2 and 3 positioned in spaced relationship and a pair of opposite end members 4 and 5 positioned in spaced relationship and extending transversely between the opposite side frames to define a space 6 with the side frames within the stocks for confining a horse or the like. The end members 4 and 5 are each in the form of end gates swingably mounted on the side frame 2 for movement between an open position providing access to the space 6 through an end gate opening and a closed position substantially blocking the end gate opening. The side frame 3 includes a side gate 7 swingably mounted on the side frame for movement between an open position providing access to the space 6 through a side gate opening and a closed positioned substantially blocking the side gate opening. The side frames 2 and 3 and end gates 4 and 5 are preferrably formed of a steel pipe welded construction although other materials could be utilized.

Figure 9:
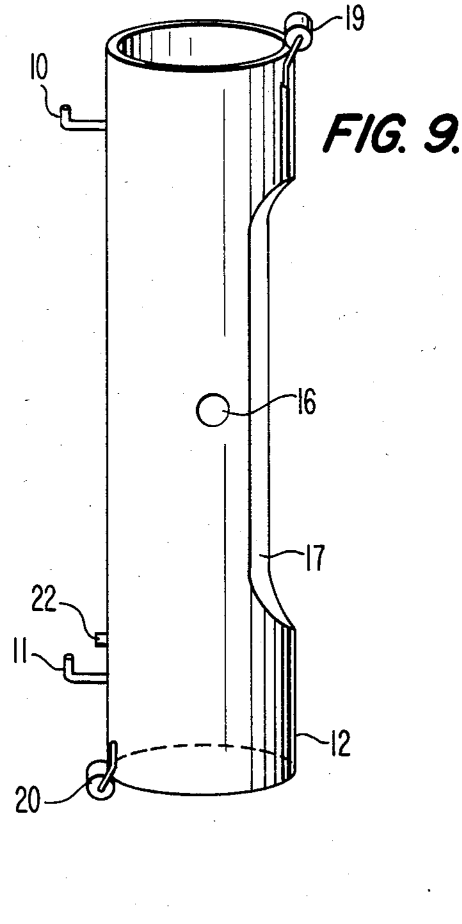
FIG. 9 is a side elevational view of a second hollow sleeve of the height adjusting means for adjusting the height of the side gate with respect to its side frame.

The side gate 7 is swingably mounted on the side frame 3 by a pair of hinges 8 and 9 which receive respective upwardly extending hinge pins 10 and 11. The hinge pins are connected in vertically spaced relationship to the outer surface of a hollow sleeve 12. The sleeve 12 in turn is telescoped over a tubular upright member 13 of the side frame 3. A spring loading locking device 14 is welded to the front side of the sleeve 12. A pin 15 of the device 14 is biased inwardly by a spring in the device 14 so that the pin 15 extends through a hole 16 in the sleeve 12 and a cooperating hole, not shown, in the upright member 13 thereby securing the sleeve 12 and side gate 7 in an upper position with respect to the upright member as shown in FIG. 1 of the drawings. The sleeve 12 further includes a longitudinally extending slot formed therein on the side toward the adjacent end gate 5 to accomodate a latching lug 18 on the upright member 13. The lug 18 is used for latching the end gate 5 in its closed position as discussed more fully hereinafter and also serves as a stop for the sleeve 12 to support the side gate and sleeve in a lower position, not shown, wherein the top of the slot 17 in the sleeve rests on the upper portion of the latching lug 18. The sleeve 12 further includes two balance rollers 19 and 20 rotatably mounted at opposite ends of the sleeve as shown in FIGS. 1 and 9. The balance rollers engage the adjacent upright member on opposite sides to prevent the sleeve 12 from binding when it is sliding on the upright member between its upper and lower positions.

The side gate 7, in its open position, can be readily removed from the side frame 3 by lifting the gate so that the hinges 8 and 9 slide relative to the respective hinge pins 10 and 11. When the gate is in place on the hinge pins and in its closed position, lifting of both the gate and the sleeve 12 is accomplished by means of a plate 21, FIG. 10, welded across the top of the lower hinge on the right side of the gate and extending under a block 22, FIG. 9, welded on the sleeve 12. When the gate 7 is fully open, the plate 21 and block 22 are swung away from each other so that the gate can be easily lifted off the hinge pins 10 and 11.

The left or free end of the side gate 7 has a spring loaded locking device 23 welded thereto with the pin 24 of the locking device extending through an aperture in the tubular side member 25 of the gate. The pin is releasably received in a cooperating opening 26 formed in an angle 27 welded to a second hollow sleeve 28 telescopingly positioned about upright member 29 of the side frame 3. The angle 27 has a top and bottom welded in to aid in lifting the sleeve 28 when the side gate is lifted. The angle also acts as a stop and stablizer for the gate in its closed position. The second sleeve 28 includes a spring loaded locking device 30 welded thereto with a pin 31 extending through an opening 32 in the sleeve. In the upper position of the side gate the pin 31 is also received in a corresponding opening, not shown, in the upright member 29 for locking the side gate and sleeves in the upper position. A longitudinally extending slot 33 is formed in the side of the sleeve 28 toward the end gate 4. The slot 33 in the sleeve 28 accomodates a latching lug, like that shown at 18, for latching the end gate 4 in its closed position. The lug on the upright member 29 also serves as a stop for the sleeve 28 to support the side gate in its lower position.

As a result of the above-described arrangement, when the side gate is in its closed position and the gate is raised, both of the sleeves 12 and 28 are raised with the gate. When the gate is lowered, both sleeves and gate are lowered, making the sleeves and gate operate as one unit. As an example, the side or front gate 7 can be made to slide up and down with the sleeves in a ten inch travel area making the top setting 48 inches above the floor and the bottom setting 38 inches above the floor. At the top setting, the pins 15 and 31 of the spring loaded locking devices 14 and 30, respectively, snap into place as the gate travels up and meets the holes drilled into the upright members 13 and 29 thereby locking the gate and sleeves into the upper position. When the lower position of the side gate is desired, the pins 15 and 31 are pulled outwardly from the spring loaded locking devices and the gate with sleeves travels to the lower position automatically. At the lower position, the sliding sleeves 12 and 28 come to rest on the end gate latching lugs. No holes are drilled in the upright members at the lower position so that it is easy for a person to raise the gate without pulling the pins, and change the gate to the higher position. Each sliding sleeve 12 and 28 also has a pair of guides 34 welded onto its adjacent upright member just below the latching lug for the end gate, adjacent each side of the longitudinally extending slot in the sleeve. The guides serve to keep the sleeves from rotating about the upright members during sliding movement thereof so that the hinges, locks, etc., will stay in alignment and function properly.

The end gates 4 and 5 are alike except that the hinges and latches thereon are reversed from side to side on the gate 4 as compared with the gate 5. Thus, only one of the gates, gate 5, will be described in detail. As shown in FIG. 1, end gate 5 is swingably mounted on the side frame 2 by means of hinges 35 and 36 on the right side thereof which are mounted on hinge pins 37 and 38, respectively, secured to the upright member 39 of the side frame.

A latch 40 is provided on the left side of the gate 5 for releasably securing the end gate in the closed position. A latching pin 41 of the latch is releasably received in the latch lug 18 on the upright member 13 of side frame 3 for this purpose. The latching pin 41 is slidably carried in a tubular portion 46 at one end of pin support member 42. The other end of the support member 42 is pivotably mounted about supporting rod 44 connected to the end gate 5. A handle 45 on the right end of the pin 41 enables the pin to be rotated and slid horizontally relative to the support member 42 and latching lug 18 for opening and closing the gate.

The height of the end gate 5 can be adjusted from the upper position shown in FIG. 1 to a lower position by opening the gate and lifting the hinges 35 and 36 off the hinge pins 37 and 38, respectively. A pin provided on one of the hinges 35 and 36 is received in an aperture in the upright member 39 when the gate 5 is closed to prevent lifting the gate in the closed position. However, opening the gate moves the pin out of the opening in the upright member so that the gate may be removed. A second set of hinge pins 47 and 48 are secured to the upright member 39 at a lower position relative to the hinge pins 37 and 38. This permits the end gate 5 to be carried by means of the hinges 35 and 36 at a relatively lower position for accomodating smaller animals. In the lower position, the gate is latched to the side frame 3 by simply pivoting the pin support member 42 about the support rod 44 to an upper position relative to the end gate whereby the latching pin 41 thereof can be received by the same latch lug 18. The end gate 4 is pivotally mounted upon the upright member 49 of the side frame 2 and latched to the upright member 29 in the same fashion so as to permit adjustment of the height of the end gate. Like the side gate 7, the end gates 4 and 5 may be set at a height of 48 inches in their upper position and 38 inches in their lower position, for example.

Figure 2:
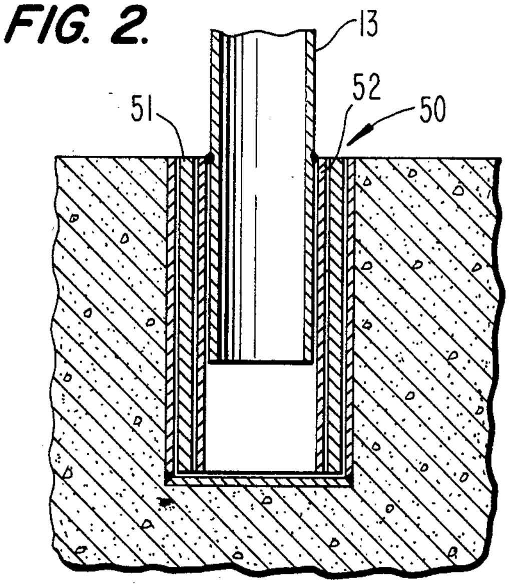
FIG. 2 is a cross-sectional view taken along the lines II—II in FIG. 1 and illustrating the means for anchoring the stocks to the floor or other surface.
Figure 7:
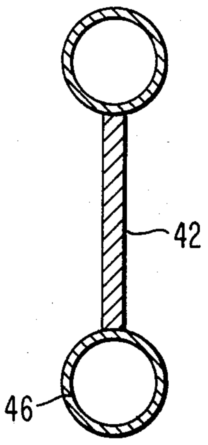
FIG. 7 is a cross-sectional view of the latch taken along the lines VII—VII of FIG. 6.
Figure 3:
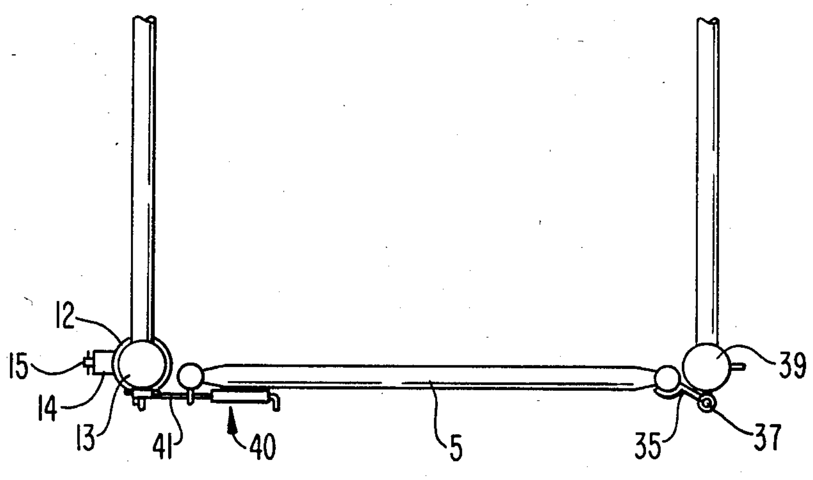
FIG. 3 is an enlarged top view of a portion of the stocks of FIG. 1 showing the end gate in its closed position.
Figure 6:
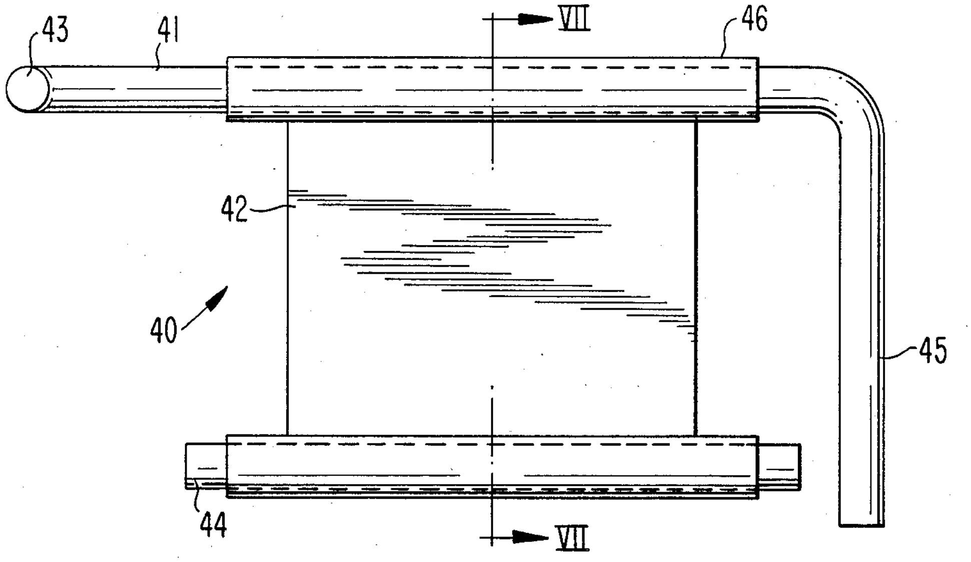
FIG. 6 is an enlarged view of the adjustable latch shown in FIG. 5.
Figure 8:
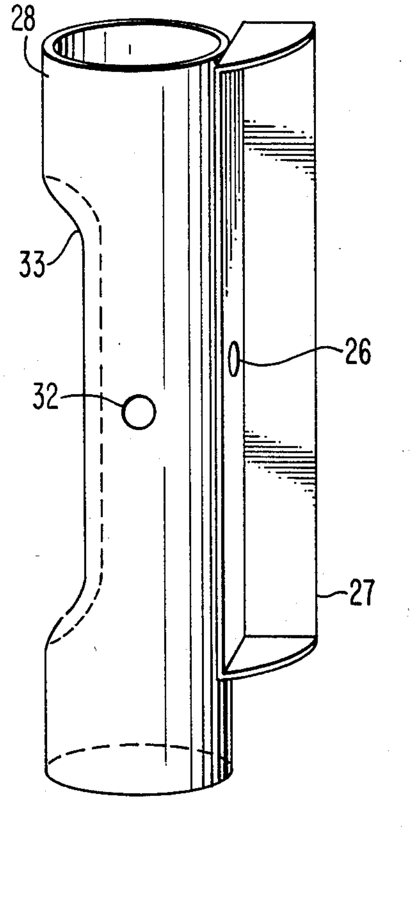
FIG. 8 is a side elevational view of a hollow sleeve of the height adjusting means for adjusting the height of the side gate with respect to its side frame.

An anchoring arrangement 50 is shown in FIG. 2 for anchoring the side frames 2 and 3 of the horse stocks to the floor or other surface upon which the stocks are assembled. An anchoring arrangement 50 is provided at the lower portion of each of the upright members of the side frames for receiving lower portions of the upright members to anchor the side frames to the floor or other surface. Each anchoring arrangement 50 includes a hollow tubular insert 51 which is at least partially recessed within the floor or other surface for receiving the lower portion of an upright member, such as upright 13 in FIG. 2. A leveling collar 52 is positioned between the upright member and its cooperating tubular insert. The leveling collar is connected as by welding to the lower portion of the upright member at a location which levels the horse stocks. The upright member 13 with leveling collar 52 can be readily removed from the hollow tubular insert 51 simply by lifting the upright. This permits the stocks to be removed and stored and later readily assembled in a level position.

From the above, it is seen that in the preferred embodiment of the invention the portable stocks include horse safety and other features to aid the veterinarian or attendant. The stocks are formed from essentially five basic components, namely, the two end gates 4 and 5, the two side frames 2 and 3, and the side gate 7 which can be mounted on the side frame 3. The other components of the stocks are made part of or attached to these five basic parts except for the hollow tubular inserts of the anchoring arrangement. In addition, these five components of the stocks may be readily assembled and disassembled. In their disassembled condition the stocks may be easily manuevered through doors, etc., and easily stored. When assembled, each of the end gates 4 and 5 and the side gate 7 can be unlatched and swung open to a 90° angle or greater from the closed position thereby allowing easy ingress and egress of the animal from the stocks and also giving the attendant the necessary accessibility required in treating the animal. Since the gates can only be lifted off their hinges in the open position, accidental removal of the gates by impact from the animal in the closed stocks is prohibited.

While I have shown and described only one embodiment in accordance with the present invention, it is understood that the same is not limited thereto, but is susceptible to numerous changes and modifications as known to those skilled in the art. Therefore, I do not wish to be limited to the details shown and described herein, but to cover all such changes and modification as are encompassed by the scope of the appended claims.

I claim:

1. Portable stocks formed from a plurality of components which may be readily assembled and disassembled for ease in transportation and storage, comprising a pair of opposite side frames of said stocks positioned in spaced relationship, a pair of opposite end members of said stocks positioned in spaced relationship and extending transversely between said opposite side frames to define a space with said side frames within said stocks for confining a horse or the like, means releasably connecting said end members to said side frames to permit said assembly and disassembly, at least one of said end members being an end gate swingably mounted on one of said side frames for movement between an open position providing access to said space through an end gate opening and a closed position substantially blocking said end gate opening, and at least one of said side frames including a side gate swingably mounted on the side frame for movement between an open position providing access to said space through a side gate opening and a closed position substantially blocking said side gate opening wherein means are provided for adjusting the height of said side gate with respect to its side frame, said height adjusting means including a pair of hollow sleeves which are slidingly positioned about respective upright members of the side frame, said side gate being swingably mounted at one end thereof to one of said sleeves and releasably connectd by latching means at its other end to the other of said sleeves when the said side gate is in its closed position.

2. Portable stocks according to claim 1, wherein means are provided for supporting said sleeves and said side gate in either a first lower position or a second higher position on said upright members of the side frame.

3. Portable stocks according to claim 2, wherein at least one of said sleeves includes a longitudinally extending slot formed therein to accomodate a latching lug on its cooperating upright member for latching said end gate in its closed position, said lug also serving as a stop for said sleeve to support said side gate in said lower position.

4. Portable stocks according to claim 3, wherein sliding sleeve guides are provided on said cooperating upright member so as to extend into said slot in said sleeve for guiding and maintaining alignment of said sleeve on said upright member.

5. Portable stocks according to claim 2, wherein said sleeve on which said side gate is swingably mounted includes two balance rollers at opposite ends thereof which engage the adjacent upright member to prevent the sliding sleeve from binding when it and the side gate are moved between said first and second positions.

6. Portable stocks according to claim 2, wherein a spring biased fastening device is provided on at least one of said sleeves for securing said sleeve to the adjacent upright member to support said side gate in said second higher position.

7. Portable stocks according to claim 2, wherein means are provided for swingably mounting said side gate to one of said sleeves so that said side gate can be readily removed from said sleeve by lifting said side gate when said side gate is in its open position, while lifting said side gate in its closed position does not remove said side gate from said sleeve but causes upward movement of both the side gate and the sleeve from said first lower position to said second higher position.

8. Portable stocks according to claim 1, wherein said means releasably connecting said end gate to said side frames includes a pair of hinge pins which are provided on one of said side frames, said hinge pins being received in hinges on said end gate for swingably mounting said end gate while permitting said end gate to be lifted off said hinge pins in its open position.

9. Portable stocks according to claim 8, wherein means are provided for preventing said end gate and hinges from being lifted off said hinge pins when said end gate is in the closed position.

10. Portable stocks according to claim 8, wherein a second pair of hinge pins are provided on said side frame in vertically spaced relationship to said first pair for adjusting the height at which said end gate is swingably mounted on said side frame.

11. Portable stocks according to claim 1, wherein each of said end members is an end gate which is swingably mounted on one of the side frames for movement between an open position and a closed position.

12. Portable stocks according to claim 1, wherein said side gate spans essentially the entire length of said side frame.

13. Portable stocks according to claim 1, wherein means are provided for anchoring said side frames of said horse stocks to the floor or other surface upon which said horse stocks are assembled.

14. Portable stocks according to claim 13, wherein said anchoring means includes means for leveling said side frames and said end members during said assembly.

15. Portable stocks according to claim 13, wherein said opposite side frames each comprise a pair of spaced upright members, lower portions of said upright members being received in said means for anchoring said side frames to the floor or other surface.

16. Portable stocks according to claim 15, wherein said means for anchoring includes hollow tubular inserts which are at least partially recessed within said floor or other surface for receiving lower portions of said upright members of the side frames.

17. Portable stocks according to claim 16, wherein a leveling collar is positioned between each of said upright members and its cooperating tubular insert, said leveling collars being connected to said lower portions of the upright members at locations which level said horse stocks.

18. Portable stocks formed from a plurality of components which may be readily assembled and disassembled for ease in transportation and storage, comprising a pair of opposite side frames of said stocks positioned in spaced relationship, a pair of opposite end members of said stocks positioned in spaced relationship and extending transversely between said opposite side frames to define a space with said side frames within said stocks for confining a horse or the like, means releasably connecting said end members to said side frames to permit said assembly and disassembly, at least one of said end members being an end gate swingably mounted on one of said side frames for movement between an open position providing access to said space through an end gate opening and a closed position substantially blocking said end gate opening, and at least one of said side frames including a side gate swingably mounted on the side frame for movement between an open position providing access to said space through a side gate opening and a closed position substantially blocking said side gate opening, wherein means are provided for adjusting the height of said at least one end gate of said horse stocks with respect to said side frames, and wherein a latch is provided on said end gate for releasably securing said end gate in the closed position to one of said side frames and wherein means are provided for adjusting the vertical position of said latch on said end gate so that said latch can releasably connect the end gate to a single stationary latch lug on said side frame at different heights of said end gate with respect to said side frames.

19. Portable stocks formed from a plurality of components which may be readily assembled and disassembled for ease in transportation and storage, comprising a pair of opposite side frames of said stocks positioned in spaced relationship, a pair of opposite end members of said stocks positioned in spaced relationship and extending transversely between said opposite side frames to define a space with said side frames within said stocks for confining a horse or the like, means releasably connecting said end members to said side frames to permit said assembly and disassembly, at least one of said end members being an end gate swingably mounted on one of said side frames for movement between an open position providing access to said space through an end gate opening and a closed position substantially blocking said end gate opening, and at least one of said side frames including a side gate swingably mounted on the side frame for movement between an open position providing access to said space through a side gate opening and a closed position substantially blocking said side gate opening, wherein said means releasably connecting said end gate to said side frames includes a pair of hinge pins which are provided on one of said side frames, said hinge pins being received in hinges on said end gate for swingably mounting said end gate while permitting said end gate to be lifted off said hinge pins in its open position, wherein means are provided for preventing said end gate and hinges from being lifted off said hinge pins when said end gate is in the closed position, wherein said means preventing the end gate from being lifted off the hinge pins in the closed position includes a stud connected to one of said hinges and a hole provided in the adjacent side frame, said hole receiving said stud when said end gate is in the closed position.

* * * * *